Patented June 6, 1950

2,510,105

UNITED STATES PATENT OFFICE 2,510,105

PROCESS FOR THE MANUFACTURE OF ORGANIC ACIDS

David G. Hedberg, Jr., Providence, R. I., assignor to Eastman Kodak Company, Rochester, N. Y., a corporation of New Jersey No Drawing. Application July 14, 1948, Serial No. 38,755

7 Claims. (Cl. 260—533)

This invention relates to a method of manufacturing lower aliphatic acids and other lower aliphatic compounds. More particularly this invention is concerned with a catalytic process involving the reaction of olefins, carbon monoxide, and water for obtaining lower aliphatic acids wherein improved conditions are maintained for obtaining better yields of the acid and better reaction.

In general reactions of the class indicated such as the reaction of olefins with carbon monoxide and steam to give lower aliphatic acids are already known in the prior art. There are numerous United States patents outstanding on this general type of reaction, but the patented methods have apparently been concerned with the vapor phase reaction in the presence of a solid catalyst. That is, steam rather than water is used as a reaction component and the reacting materials in the vapor phase are passed into contact with a solid catalyst exemplified by impregnated charcoal, phosphoric acid, and the like. The use of a solid catalyst involves dismantling the reactor for replacement of catalyst and other similar problems of maintenance.

There is considerable prior art outstanding in foreign work. That is, German processes have been described on the reaction of ethylene, carbon monoxide and water in the presence of nickel carbonyl catalyst under temperature conditions of, for example, 200° C. to 300° C. and 150 to 300 atmospheres pressure. The formation of the nickel carbonyl catalyst has involved reacting a source of nickel with ammonia for obtaining a complex which is redissolved and treated, thereby involving a rather complicated procedure.

As will be explained in further detail hereinafter in describing the work leading up to the present invention the aforementioned prior type of process either appeared to be inoperative or if it went, the speeds were low and accompanied by substantial corrosion.

In accordance with the present invention there has been discovered what is believed to be an improvement in the above type of reaction in several aspects, such as simplification of catalyst, improved control of reaction conditions, and other features set forth in detail hereinafter, all of which gives better reaction and an improved process for the manufacture of lower aliphatic acids.

This invention has for one object to provide an improved process for the manufacture of lower aliphatic acids from olefins, carbon monoxide and water. Another object is to provide a process of the class indicated which may be carried out in the liquid phase. Still another object is to provide a catalyst for use in such type of process for manufacturing lower aliphatic acids which catalyst is simpler and easier to prepare and use than catalysts heretofore employed. Still another object is to provide a continuous liquid phase process for producing lower aliphatic acids and in which the desired acid component may be segregated from other reaction products therewith. Further objects will be apparent hereinafter.

In the early studies leading up to the present invention numerous tests were carried out on the prior art, vapor phase type of process and the like. For example, tests were made of a vapor phase process using the recommended phosphoric acid as a catalyst. Carbon monoxide and ethylene were reacted in the presence of concentrated (50–70%) phosphoric acid at temperatures between 200° and 275° C., and pressures between 2,100 and 2,800 lbs. gage. The products showed some organic acids, mainly propionic, in about 5% yield, based on $C_2H_4$, and neutral organic material. The neutral material, of which about 50% boiled above 120° C., was a complicated mixture of oxygenated compounds. The isolation of ethanol and small amounts of diethyl ether from the lower boiling portion shows that at least a part of the $C_2H_4$ is converted to products without entering into combination with CO. These reactions were carried out in a copper lined reactor since both iron and stainless steel were badly corroded by the reaction mixture.

It was apparent from these runs that phosphoric acid was not particularly satisfactory as a catalyst. Also there were the disadvantages of corrosion and that a large part of the olefins did not react with the carbon monoxide.

Consequently, it was determined to carry out vapor phase runs using different catalysts. In these representative vapor phase runs to be referred to below a commercially available cobalt catalyst material produced by the Harshaw Chemical Company and sold under the trade name or designation Harshaw No. 268 was employed. This catalyst is composed principally of cobalt but contains more thoria and differs from another catalyst produced by Harshaw and sold under the designation No. 542, referred to later, in that No. 268 contains no magnesia.

Substantially negative results were obtained when operating in the vapor phase with this catalyst as apparent from the Table A below:

TABLE A
*Vapor phase reactions utilizing cobalt catalyst*

Charge:
    200 grams catalyst No. 268
    200 cc. $H_2O$
    1500 lbs. gage $CO/C_2H_4$ mole ratio: 0.9
Reaction Temp.: 200° C.-205° C.
    Time, 6 hrs.

| Run No. | Pressure Drop | Final Pressure Cool | Yield of Products Org. | Yield of Products acid | Soln. |
|---|---|---|---|---|---|
| H-14 | 3,220-3,130 | 1,300 | Cc. 0 | M. eq. 50 | colorless. |
| H-15 | 2,800-2,275 | 900 | 8.0 | | pink—carbonyls present. |

In each run the catalyst was held in a stainless steel screen tube supported above the aqueous phase on stilts. No reaction took place in these experiments unless the product solution contained carbonyls and was pink in color indicating that some of the cobalt in the catalyst was dissolved by condensation and dripped down into the liquid phase. The comparatively large pressure drop and the presence of neutral organic material in H-15 indicates that there was more reaction than in H-14. No acid determination was made for H-15 because of the presence of carbonyls.

Inasmuch as the early studies indicated that the vapor phase conditions of the prior art were not conducive to reaction but that the reaction, if any, might be coming from the liquid phase occasioned by the incidental condensation drip, further studies leading to the present invention were directed to the liquid phase operation.

In accordance with the broader aspects of the present invention it has been found that a liquid phase reaction may be carried out for producing lower aliphatic acids from the catalytic reaction of olefins, carbon monoxide and water. The preferred catalyst of the present invention comprises a lower aliphatic acid salt of cobalt as will be described in detail hereinafter. While various concentrations of this catalyst may be used, it has been found that small and economical concentrations of the order of 0.05 to 0.1 normal solution of said cobalt salt function satisfactorily. While various gas ratios are operable in the reaction, it has been found that excess carbon monoxide with respect to the olefin component such as approximately a 3:1 ratio when employing reaction pressures within the range of 2,100-4,000 p. s. i. favor the production of lower aliphatic acids. Although various solvents for containing the catalyst and functioning as a reaction medium may be used, the process of the present invention operates very well with readily available liquids, such as alcohols and preferably water which not only will function as a solvent for the catalyst but constitutes a component of the reaction. The temperature range which may be employed in the present invention is usually between 150° C. to 250° C. and the preferred temperature range is around 200° C., say for example 200° C. to 225° C. The liquid phase process of the present invention may be carried out in a continuous fashion as will be described in detail hereinafter.

A further understanding of the present invention will be had from a consideration of the following examples which are set forth primarily for the purposes of illustration and for showing the effect of catalyst, gas ratios and the like. Hence, these examples are not to be considered an undue limitation on the present invention.

EXAMPLE I

In accordance with this example a series of runs are described wherein different forms of cobalt catalyst are compared. These runs were carried out at a temperature within the range of 200° C. to 230° C. and under pressures slightly in excess of 3,000 p. s. i. Sufficient ethylene and carbon monoxide were pressed into the reactor to obtain the aforesaid pressure.

| Run No. | Solution Charged | Catalyst Used | Product Propionic Acid | Product Organic |
|---|---|---|---|---|
| | | | Millimoles | Cc. |
| N-126 | 1 l., ¼ N, propionic acid. | Co, metal on walls | 550 | 7.3 |
| N-118 | 1 l. $H_2O$ | 20 g. Co $(OPr)_2$ ignited | 791 | 32 |
| H-33 | 500 cc. $H_2O$ | 100 g. Catalyst No. 542,[1] oxidized. | 324 | 15 |
| N-117 | 1 l. $H_2O$ | 20 g. Co $(OPr)_2$ | 1,614 | 20 |

[1] Catalyst 542 is a well known commercial material made up of cobalt oxide, thoria, magnesia and kieselguhr.

From numerous runs of the above type it was observed that the use of cobalt propionate as a catalyst gave more favorable yields of the desired lower aliphatic acid.

EXAMPLE II

In accordance with this example another series of runs as in Example I were carried out with various cobalt catalysts. The runs were conducted at a temperature of approximately 220° C. and a pressure between 3,500 to 4,000 p. s. i., as shown in the following table:

| Run No. | Catalyst Used | Initial Co in Solution | Mole Ratio Charge Gas $CO/C_2H_4$ | Product Cobalt | Product Propionic Acid | Product Org. | Minutes Reaction Time |
|---|---|---|---|---|---|---|---|
| | | | | g./l. | Millimoles | Cc. | |
| N-126 | Metal on walls | none | 3.7 | 1.2 | 555 | 7.3 | 30 |
| N-118 | oxide | none | 1.6 | 5.5 | 791 | 32.0 | 50 |
| N-117 | Co(OPr)_2 | 5.9 g. | 3.5 | 5.9 | 1,614 | 20.0 | 55 |
| N-113 | ---do--- | 5.9 g. | 2.4 | 5.9 | 1,207 | 25.0 | 65 |

Under the increased pressure conditions it was observed that the cobalt propionate type of catalyst still favored the production of the lower aliphatic acids.

EXAMPLE III

In accordance with this example the same temperatures and pressures were maintained as in the preceding example, namely approximately 220° C. to 230° C. temperature and 3,500 p. s. i. pressure. However, in a series of runs of this example the concentration of the cobalt propionate type of catalyst was varied from low to relatively higher amounts as shown in the following table:

| Run No. | Co Conc. | Charge Gas Mole Ratio $CO/C_2H_4$ | Product | | | Minutes Reaction Time |
|---|---|---|---|---|---|---|
| | | | Propionic Acid | Org. | $CO_2$ | |
| | | | Millimoles | Cc. | Moles | |
| N-127 | .025 N | 3.6 | 581 | 2.5 | .22 | 30 |
| N-125 | 0.1 N | 4.5 | 943 | 9.2 | .54 | 50 |
| A-22 | 0.3 N | 2.0 | 830 | 13.0 | .49 | 30 |
| H-86 | 1.0 N | 4.1 | 744 | 19.0 | | 40 |

It was observed that the reaction proceeded at all of the concentrations used. However, the employment of, for example a 0.1 N catalyst concentration indicated that reasonably small amounts of catalysts of the present invention function satisfactorily and this is advantageous from the practical standpoint in giving low cost operation.

EXAMPLE IV

In accordance with this example the propionate type of catalyst was employed. Temperatures and pressures and other conditions were maintained approximately the same, but ratio of the gases was varied from approximately an equal ratio to a ratio in which the carbon monoxide was several times in excess of the olefin.

| Run No. | Charge Gas Mole Ratio $CO/C_2H_4$ | Conc. Cobalt Normality | Product | | |
|---|---|---|---|---|---|
| | | | Propionic Acid | Org. | $CO_2$ |
| | | | Millimoles | Cc. | Moles |
| A-9 | 1.2 | 1.0 | 700 | 49 | 1.5 |
| A-11 | 1.4 | 0.3 | 1,027 | 42 | .90 |
| A-12 | 1.9 | 0.3 | 1,102 | 54 | .65 |

| Run No. | Charge Gas Mole Ratio $CO/C_2H_4$ | Product | | | Minutes Reaction Time |
|---|---|---|---|---|---|
| | | Propionic Acid | Org. | $CO_2$ | |
| | | Millimoles | Cc. | Moles | |
| N-125 | 4.5 | 943 | 9.2 | 0.54 | 40 |
| N-117 | 3.6 | 1,614 | 20.0 | .50 | 55 |
| N-103 | 0.99 | 687 | 16 | .60 | 70 |
| N-113 | 1.1 | 1,207 | 25 | .80 | 60 |

From this type of run it was observed that by increasing the ratio of the carbon monoxide to the olefin, for example up to 3 or 4 times, that the reaction was improved. That is, the 3:1 ratio based on the reaction pressure of around 3,100 p. s. i. represents a preferred condition.

EXAMPLE V

In accordance with this example a series of runs were carried out for determining whether the aliphatic acid produced tended to decompose under the preferred conditions described above. In these runs propionic acid was added to an 0.3 N cobalt propionate solution and the reaction mixture processed under temperatures up to 240° C. and with various CO/ethylene ratios.

| Run No. | Initial Propionic Acid | Final Propionic Acid | Product | |
|---|---|---|---|---|
| | | | Propionic Acid | Org. |
| | Moles | Moles | Moles | Cc. |
| H-88 | .17 | 1.05 | .88 | 19 |
| H-89 | 2.67 | 3.57 | .90 | 16 |
| H-92 | 5.17 | 6.15 | .98 | 6 |

In general it was observed that under the preferred conditions of the present invention the acid content is not decomposed. While at higher catalyst concentrations there was some indication of a drop in the acid content, this did not appear to be substantial.

A number of other runs were carried out for checking other aspects as will be apparent from the following additional examples in which some of the data, for brevity, is given in summary form.

EXAMPLE VI

*Liquid phase reactions with differently treated catalysts*

Charge for H-23 and H-24:
   500 cc. $H_2O$
   1500 lbs. gage $CO/C_2H_4$ mole ratio: 1.9
   Temp., 205° C.-210° C.
   Time, 5.5 hrs.

| Run No. | Catalyst | Pressure Drop | Final Pressure Cool | Yield of Products | |
|---|---|---|---|---|---|
| | | | | Org. | acid |
| | | | | Cc. | M. eq. |
| H-23 | 100 g. Co No. 268 reduced. | 2,510-2,300 | 1,010 | 25 | 119 |
| H-24 | Catalyst from H-23 re-used. | 2,870-2,580 | 1,200 | 26.7 | 129 |

Charge for H-31 and H-34:
   500 cc. $H_2O$
   1100 lbs. gage $CO/C_2H_4$ mole ratio: 1.9
   Temp., 245° C.-250° C.
   Time, 4.5 hrs.

| Run No. | Catalyst | Pressure Drop | Final Pressure Cool | Yield of Products | |
|---|---|---|---|---|---|
| | | | | Org. | acid |
| | | | | Cc. | M. eq. |
| H-31 | 100 g. Co No. 542 reduced. | 2,600-2,175 | 650 | 13.5 | 268 |
| H-34 | 100 g. Co No. 542 unreduced. | 2,660-2,330 | 700 | 19.7 | 282 |

When it was observed that, in liquid phase reactions of the present invention, different methods of processing the Commercial Cobalt catalysts had little effect on the reaction, the following runs were performed. A standard reaction using catalyst No. 542 as above was made. The catalyst was removed from the product solution by filtration and the neutral organic material was distilled off. The pink solution recovered was used as the charge solution for the next reaction. The results given in Example VII show that this solution acted as a catalyst for the reaction.

EXAMPLE VII

Reactions showing catalytic activity of solution

Charge: 1,500 lbs. gage CO/C₂H₄ mole ratio: 0.9
Reaction time: 4.5 hrs.

| Run No. | Charge Soln. | | Pressure Drop | Final Pressure Cool | Yield of Products | |
|---|---|---|---|---|---|---|
| | Catalyst | H₂O | | | Org. | Acid |
| H-46 | 100 g. Co No. 542 reduced. | Cc. 500 | 2,650–2,200 | 980 | Cc. 33 | Moles .27 |
| H-47 | Soln. from Run H-46. | | 2,800–2,525 | 1,100 | 35 | .30 |

The next run (H-56) contains the results of a reaction carried out using a prepared solution of cobalt propionate as catalyst.

Reaction employing cobalt propionate solution

Charge: 1,500 lbs. gage CO/C₂H₄ mole ratio: 2.3
200 cc. H₂O
Temp.: 180° C.–210° C.
Max. Pressure: 2,500–3,100 lbs. gage

| Run No. | Catalyst | Conc. Co eq./liter | Reaction Time | Yield of Products | |
|---|---|---|---|---|---|
| | | | | Org. | Acid |
| H-56 | aqueous cobalt propionate. | 0.90 | Hrs. 4.5 | Cc. 35 | Moles .43 |

The reaction listed in Example VIII indicates that the reaction of propylene in the presence of cobalt butyrate seems to proceed very much like the reaction with ethylene and the propionate.

EXAMPLE VIII

Reaction employing cobalt butyrate solution

Charge:
500 cc. aqueous cobalt butyrate soln.
1100 lbs. gage CO
230 lbs. gage propylene mole ratio: 2:1

| Run No. | Catalyst Conc. | Time | Yield of Products | |
|---|---|---|---|---|
| | | | HOBu | Org. |
| H-97 | 0.3 N | Hours 2 | Moles .66 | Cc. 35 |

It is apparent from the foregoing examples that cobalt derivatives of lower aliphatic acids function satisfactorily in the liquid phase reaction of olefins, carbon monoxide, and water.

The above examples have been primarily directed to batch operations in which an olefin, carbon monoxide and water have been reacted in the liquid phase under elevated temperatures and pressures for giving substantial yields of propionic acid. Although the yields predominate in propionic acid, there are certain amounts of other reaction products produced which in the several runs have been designated as "Org. cc." The principal additional product produced in the above examples was diethyl ketone.

The process of the present invention is also adapted to continuous operation as follows. The cobalt propionate catalyst of the present invention contained in a suitable solvent such as water is charged into a reactor such as a conventional stainless steel column adapted to obtaining gas and liquid contact. The compressed CO/olefin in the preferred ratio of about 3:1, as already discussed, is pressed through the catalyst solution contained in the column. The reaction in the column is maintained under the pressure and temperature conditions already described, namely around 200° C. to 225° C. and between 3,000 to 4,000 p. s. i. The column would, of course, be of sufficient length, under the conditions used, to give a reasonable amount of reaction.

The effluent gases from the reaction column are continuously withdrawn through a scrubber to remove any CO₂. This scrubbing and removing CO₂ may be carried out either hot or cold and with conventional scrubbing agents. The scrubbed gases are continuously returned to the start of the process where, after adding make-up CO and ethylene to bring the composition back to the aforementioned 3:1 ratio, the gases are again continuously fed into the column.

As the above described continuous reaction with recycling is being carried out, a certain amount of liquid is continuously pumped out of the column reactor (usually from the bottom of the reactor). However, care would be exercised that too great an amount of liquid is not removed so that insufficient liquid remains for catalytic contacts with the CO/olefin. The liquid thus removed is passed to and through an extraction system charged with benzene or other suitable solvent, for extracting ketone and propionic acid. The reaction liquid thus depleted of the reaction products, propionic acid and ketone, may then be recycled back to the reactor, preferably into the top of the column.

However, before so recycling, in the preferred embodiment of continuous operation, this liquid is reheated and preferably given a treatment with carbon monoxide under pressure. As a matter of fact, either when starting the continuous process, or during long operation, the preconditioning of the catalyst and reaction liquid by treatment thereof with carbon monoxide under elevated temperatures and pressures is advantageous. These temperatures and pressures for the reconditioning of the liquid may be the same temperatures and pressures used during the reaction and which have been described in detail above. However, lower temperatures, say of the order of 150° C. and lower pressures of 2,000 to 3,000 p. s. i. may also be used in this preconditioning treatment of the liquid containing the catalyst of the present continuous operation.

The ketone and acid separated in the aforementioned extraction distribute between the solvent phase and the aqueous catalyst phase and may be separated therefrom in any one of a number of ways known to those skilled in the art.

The ketone and extracting agent, such as benzene or the like solvent, may be separated from catalyst and reaction liquid by distillation. Other extracting agents besides benzene may be employed, of which numerous examples are mentioned in the prior art, such as toluene, and various esters.

In general, in operating the process of the present invention, either batchwise, continuously, or intermittently, it is preferred to utilize a closed system and exclude oxygen and CO₂ wherever possible, particularly the action of oxygen upon the catalyst at reaction temperatures and in the reaction. That is, the cobalt propionate catalyst of the present invention is preferably prepared, maintained, and used away from undue exposure to oxygen.

The catalyst of the present invention lends itself to continuous operation in that it is an easily pumpable nonerosive fluid. While a slurry may be used if desired, it is quite possible in the present invention to merely incorporate the cobalt propionate or other lower aliphatic acid salt in a solvent, such as water and/or alcohol or the like, heat and activate with carbon monoxide under pressure, separate any solids in a usual manner as by filtration or centrifugation and employ the resultant solid-free liquid as the catalyst.

In the above examples emphasis has been placed on the production of propionic acid as the preferred embodiment. In a similar manner by using a higher olefin and preferably the cobalt salt of the corresponding aliphatic acid, other aliphatic acids may be produced in a similar manner.

Inasmuch as the cobalt derivative of a lower aliphatic acid functioned satisfactorily, as above described, and under a wide variety of conditions, it was determined to carry out further studies for ascertaining whether other similar metal derivatives would likewise function. The results of these studies are summarized in Table B below. It is interesting to note that metal propionates, other than cobalt did not appear to be active in the production of propionic acid by liquid phase reaction of carbon monoxide and $C_2H_4$ with water, duced by any of the materials employed. In fact, with some substances, particularly ferric iron, the propionate initially present may be destroyed. Especially noteworthy are the results of the work employing nickel propionate. In this system no reaction whatever involving the ethylene occurred. However, substantially all the nickel was converted to the carbonyl, and 90% of the metal separated from the aqueous solution as a layer of liquid $Ni(CO)_4$.

In the several examples illustrating the process of the present invention the production of acid has been referred to in "mole" values which, for example, for comparison with the use of other catalysts such as those in Table B, provide a direct basis of comparison. In terms of percentage yield based on the olefin consumed, reasonable reaction times and the like and employing at least some of the preferred conditions specified, at least 40% and in many instances 70% or 80% conversion, may be expected with good operation, particularly when operating a continuous process, as shown by the following tabulation.

Percentage yields of acid for two reactions estimated on the basis of ethylene consumed are given in the following table:

| Exp. No. | Co (OPr)$_2$ conc. | CO/C$_2$H$_4$ mole ratio | Temp. | Yield of propionic acid based on C$_2$H$_4$ |
|---|---|---|---|---|
| | | | °C. | Per cent |
| A-22 | 0.3 N | 1.8 | 230 | 73 |
| N-117 | 0.1 N | 3.6 | 225 | 85 |

TABLE B

Runs employing solutions of several propionates as catalysts in the reaction of CO and $C_2H_4$ Charge:
500 cc. H$_2$O
400 lbs. gage C$_2$H$_4$ } CO/C$_2$H$_4$ mole ratio: 1.9
1100 lbs. gage CO
Catalyst
Reaction Temp.: 190°–205° C.
Max. Pressure: 2900–3500 lbs. gage

| Run No. | Catalyst and Conc. | Reaction Time | Total Acid | | Yield of Products | | |
|---|---|---|---|---|---|---|---|
| | | | Employed | Recovered | Moles Acid | | Org. |
| | | | | | Formic | HOPr | |
| | | Hours | Moles | Moles | | | Cc. |
| H-61 | None | 5.5 | 0 | 0 | | | |
| H-55 [1] | Na, 0.3 N | 5.4 | 0.15 | 0.26 | .02 | .09 | 2 |
| H-60 | Na, 2.0 N | 4.0 | 1.00 | 1.48 | .60 | –.12 | 0 |
| H-59 [2] | Fe$^+$, 3.4 N | 4.5 | 1.9 | 0.98 | | | 0 |
| H-67 [2] | Fe$^{+2}$, 1.4 N | 3.8 | 0.70 | 0.72 | | | 0 |
| H-63 [2] | Mn$^{+2}$, 1.0 N | 3.9 | 0.50 | 0.56 | .09 | –.03 | 0 |
| H-64 | Zn, 1.0 N | 4.7 | 0.49 | 0.48 | | | 0 |
| H-64a [2] | Cr$^{+3}$, 1.3 N | 4.0 | 0.63 | 0.63 | 0 | 0 | 0 |
| H-66 [2, 3] | Ag, 0.05 N | 5.7 | 0.03 | 0.05 | | | 0 |
| H-68 [2, 3] | Cu$^{+2}$, 1.0 N | 4.5 | 0.54 | 0.55 | | | 0 |
| H-69 [4] | Ni$^{+2}$, 1.0 N | 6.3 | 0.57 | 0.57 | | | 0 |
| H-70 | Co$_3$(PO$_4$)$_2$ in 7 N H$_3$(PO$_4$), 1.0 N | 8.0 | 0 | 0.07 | .06 | .01 | 10 |

[1] Cobalt found in product solution.
[2] Precipitate formed during reactions.
[3] Free metal produced.
[4] Ni converted to Ni(CO)$_4$.

Under the conditions in the above experiments, it is seen that, in contrast to the results previously set forth for cobalt solutions, no appreciable amounts of acids other than formic were produced by any of the materials employed. From yields estimated for other similar reactions, at least 50%, and in many instances, on employing some of the preferred conditions, 70% to 85% yields of propionic acid were obtained.

The following table gives data illustrating the effect of $CO_2$ on the reaction. In both instances, N-157 and N-159, solid $CO_2$ was added to the standard aqueous cobalt propionate solution.

*Effect of $CO_2$ in initial gas charge*

Charge:
1000 cc. 0.1 N aqueous $Co(OPr)_2$ solid $CO_2$
gas mixture ($CO/C_2H_4$ mole ratio 2.1)
1500 lbs. gage reaction temp. 225°–230° C.

| Exp. No. | Initial $CO_2$ | Reaction Time | HOPr Produced | Product Gas, mole ratio | | Pressure Max. |
| --- | --- | --- | --- | --- | --- | --- |
| | | | | $CO/C_2H_4$ | $CO_2$ | |
| | Per cent | Hours | Moles | | Per cent | Pounds |
| N-157 | 12 | 1.5 | 0.63 | 32.0 | 24 | 3,900 |
| N-159 | 27 | 1.0 | none | 2.0 | [1] 27 | [1] 4,500 |

[1] Part of the gas was bled off during heating because of excessive pressures developed. The cobalt was found to be almost completely precipitated as a carbonate on opening the reactor.

It will be seen from this table that the presence of carbon dioxide in the reaction mixture in excess of 27 per cent has a profound effect upon the amount of propionic or other aliphatic acid which will be produced in the reaction. Thus, as previously indicated, it is important to control the amount of carbon dioxide, particularly in operations where the excess or unused gases (CO and $C_2H_4$) are recirculated into the reaction liquid. In some cases it was found that where substantial amounts of carbon dioxide were present a dark gummy deposit was formed from the catalyst material and in some cases the catalyst was actually converted to cobalt carbonate. This is, of course, an undesirable condition which destroys or depletes the catalyst and adversely affects the yields of desired acid product. In general, it may be said that the carbon dioxide content of the reaction liquid should, in either batch or continuous operation, be kept below 27 or 28 per cent.

While in the above examples and description, I have indicated that the preferred ratio of CO to ethylene or other olefine is 3:1, the reaction is operative to produce propionic and other aliphatic acids at almost any ratio of CO to ethylene. The chief disadvantage of operating substantially above or below this ratio is that the reaction will be slower than is the case when operating close to the preferred value.

It is evident from the foregoing detailed description that the employment of a cobalt catalyst in solution, liquid phase conditions, and carrying out the reaction as above described constitute a unique and unusual method of manufacturing aliphatic acids and is thus a valuable contribution to the art.

I claim:

1. In a process of manufacturing lower aliphatic acids by a procedure comprising reacting an olefin, carbon monoxide and water at temperatures and pressures within the range of 200° C. to 250° C. and 2,000 to 4,000 p. s. i. and in the presence of an aqueous cobalt-containing catalyst liquid of .025 to 1.0 normality as respects the cobalt component, the process being characterized in that said catalyst liquid is prepared by incorporating a cobalt salt of a lower aliphatic acid in an aqueous solvent therefor, activating the resultant solution with carbon monoxide, separating any solids therefrom and employing the resultant solid-free liquid as the catalyst liquid of .025 to 1.0 normality aforementioned.

2. In a process of manufacturing lower aliphatic acids by reacting an olefin, carbon monoxide and water at temperatures and pressures within the range of 200° C. to 250° C. and 2,000 to 4,000 p. s. i. and in the presence of a catalyst liquid containing cobalt of a normality between .025 N and 1.0 N, the process being characterized in that said catalyst liquid has been treated to render it solid-free, and is prepared, maintained and used away from undue exposure to oxygen.

3. A continuous process for the liquid phase reaction of olefin, carbon monoxide and water to produce a lower aliphatic acid which comprises continuously pressing carbon monoxide and olefin at pressures within the range of 3,000 to 4,000 p. s. i. into the lower portion of a column of aqueous catalyst solution containing a cobalt concentration between .025 N. and 1.0 N., said cobalt catalyst in the form of cobalt derived from a cobalt salt of a lower aliphatic acid, said catalyst solution being at a temperature between 200° C. to 250° C., removing effluent gases from the column head, scrubbing the removed gases to separate any carbon dioxide, supplying further olefin and carbon monoxide to the scrubbed gases for make-up, recycling, the made-up gases to the start of the process, substantially simultaneously with the aforesaid steps withdrawing liquid from the reaction, treating said liquid to remove lower aliphatic acid therefrom and leave a residue liquid containing catalyst, reconditioning this residue liquid with carbon monoxide and returning the reconditioned catalyst liquid into the reaction.

4. A continuous process for the liquid phase reaction of olefin, carbon monoxide and water to produce a lower aliphatic acid which comprises continuously pressing carbon monoxide and olefin at pressures in excess of 2,500 p. s. i. but below 4,000 p. s. i into and through a column of aqueous catalyst solution containing a cobalt concentration between .025 N and 1.0 N, the cobalt catalyst in the form of cobalt derived from a cobalt salt of a lower aliphatic acid, said catalyst being heated to between 200° C. to 250° C., removing effluent gases from the catalyst solution, scrubbing the gases to remove carbon dioxide, supplying further olefin and carbon monoxide to the scrubbed gases for make-up and recycling the made-up gases to the start of the process, substantially simultaneously with the aforesaid steps withdrawing liquid from the reaction, treating said liquid to remove lower aliphatic acid therefrom and leave a residue liquid containing cobalt catalyst, reconditioning this residue liquid by treatment under elevated temperature and pressure with carbon monoxide and returning reconditioned catalyst liquid to the reaction.

5. A continuous process for the liquid phase reaction of olefin, carbon monoxide and water to produce a low aliphatic acid which comprises continuously pressing carbon monoxide and olefin at pressures in excess of 2,000 p. s. i. but below 4,000 p. s. i. into and through an aqueous catalyst solution containing at least 85% water and containing a cobalt catalyst in the form of cobalt of .025 to 1.0 normality derived from a cobalt salt of a lower aliphatic acid maintained out of contact with oxygen, said catalyst being heated to between 200° C.–250° C., removing effluent gases from the catalyst solution, scrubbing the gases to remove carbon dioxide, supplying further olefin and carbon monoxide to the scrubbed gases for make-up and recycling the made-up gases to the start of the process, substantially simultaneously with the aforesaid steps withdrawing liquid from the reaction, treating said liquid to remove lower aliphatic acid therefrom and leave a residue liquid containing cobalt catalyst, reconditioning this residue liquid with carbon monoxide and returning the reconditioned catalyst liquid to the reaction.

6. A continuous process for the liquid phase reaction of olefin, carbon monoxide and water to produce a lower aliphatic acid which comprises continuously pressing carbon monoxide and olefin in the ratio of about 3:1 at pressures within the range of 3,000 to 4,000 p. s. i. into and through an aqueous catalyst solution between .05 N. to .3 N in cobalt derived from a lower aliphatic acid salt of cobalt, said catalyst being heated to between 200° C. to 250° C., removing effluent gases from the catalyst solution, scrubbing the gases to remove carbon dioxide, supplying further olefin and carbon monoxide to the scrubbed gases for make-up to said ratio and recycling the made-up gases to the start of the process, substantially simultaneously with the aforesaid steps withdrawing liquid from the reaction, extracting said liquid to remove lower aliphatic acid and ketone therefrom and leave a residue liquid containing catalyst, reconditioning this residue liquid with carbon monoxide and returning the reconditioned catalyst liquid to the reaction.

7. A continuous process for the liquid phase reaction of olefin, carbon monoxide and water to produce a lower aliphatic acid and ketones which comprises continuously pressing carbon monoxide and olefin at pressure between 3,000–4,000 p. s. i. into and through an aqueous catalyst solution containing at least 85% water and containing a cobalt catalyst of .025 to 1.0 normality with respect to the cobalt component, said caltalyst being heated to between 200° C.–250° C., removing effluent gases from the catalyst solution, scrubbing the gases to remove carbon dioxide, supplying further olefin and carbon monoxide to the scrubbed gases for make-up and recycling the made-up gases to the process, substantially simultaneously with the aforesaid steps also withdrawing liquid from the reaction, extracting said liquid to remove lower aliphatic acid therefrom and leave a residue liquid containing cobalt catalyst, reconditioning this residue catalyst liquid with carbon monoxide and returning the reconditioned catalyst liquid to the reaction.

DAVID G. HEDBERG, Jr.

REFERENCES CITED

The following references are of record in the file of this patent:

UNITED STATES PATENTS

| Number | Name | Date |
| --- | --- | --- |
| 2,448,368 | Gresham et al. | Aug. 31, 1948 |
| 2,448,375 | Larson | Aug. 31, 1948 |